United States Patent [19]

Thiel et al.

[11] Patent Number: 5,631,736
[45] Date of Patent: *May 20, 1997

[54] ABSOLUTE INTERFEROMETER MEASURING PROCESS AND APPARATUS HAVING A MEASURING INTERFEROMETER, CONTROL INTERFEROMETER AND TUNABLE LASER

[75] Inventors: Jürgen Thiel, Aachen; Dieter Michel, Traunstein; Andreas Franz, Trostberg, all of Germany

[73] Assignee: Dr. Johannes heidenhain GmbH, Traunreut, Germany

[*] Notice: The term of this patent shall not extend beyond the expiration date of Pat. No. 5,521,704.

[21] Appl. No.: 614,334

[22] Filed: Mar. 12, 1996

Related U.S. Application Data

[63] Continuation of Ser. No. 236,927, May 2, 1994, abandoned.

[30] Foreign Application Priority Data

May 3, 1993 [DE] Germany ............... 43 14 486.1

[51] Int. Cl.[6] .................... G01B 9/02; G01B 11/02
[52] U.S. Cl. .................................. 356/349; 356/358
[58] Field of Search ................... 356/345, 349, 356/358

[56] References Cited

U.S. PATENT DOCUMENTS

| | | | |
|---|---|---|---|
| 3,647,302 | 3/1972 | Zipin et al. | 356/349 |
| 3,970,389 | 7/1976 | Mendrin et al. | |
| 4,596,466 | 6/1986 | Ulrich | 356/345 |
| 4,813,783 | 3/1989 | Torge | 356/358 |
| 4,974,961 | 12/1990 | Jackson et al. | 356/345 |
| 4,984,898 | 1/1991 | Höfler et al. | 356/358 |
| 5,189,677 | 2/1993 | Yry | 356/349 |
| 5,301,010 | 4/1994 | Jones et al. | 356/345 |

FOREIGN PATENT DOCUMENTS

| | | |
|---|---|---|
| 3404963C2 | 8/1985 | Germany. |
| 3421213 | 12/1985 | Germany. |
| 3608075C2 | 10/1986 | Germany. |
| 35 28 259 | 2/1987 | Germany. |
| 8502346.9 | 10/1989 | Germany. |
| 3918812 | 12/1989 | Germany. |
| 3836174 | 5/1990 | Germany. |
| 3841742 | 6/1990 | Germany. |
| 4039955 | 6/1992 | Germany. |
| 4100773 | 7/1992 | Germany. |
| 8806711 | 9/1988 | WIPO. |

OTHER PUBLICATIONS

Schüssler, H. "Comparison and Calibration of Laser Interferometer Systems," *Measurement*, vol. 3, No. 4, Oct.–Dec. 1985, pp. 175–184.

*Primary Examiner*—Frank Gonzalez
*Assistant Examiner*—Jason D. Vierra Eisenberg
*Attorney, Agent, or Firm*—Brinks Hofer Gilson & Lione

[57] ABSTRACT

An absolute measuring interferometer having a measuring interferometer, a tunable laser emitting a laser beam and a control interferometer for adjusting the air wavelength of the laser beam. The control interferometer adjusts the air wavelength of the laser beam to a specific wavelength value at the ends of each measuring cycle. The wavelength of the tunable laser is continually tuned within the specific wavelength interval where the phase change of the interference signal is continually detected during the wavelength modulation process. An absolute measurement is determined by a simple mathematical relationship between the measured wavelength and phase changes.

20 Claims, 2 Drawing Sheets

ABSOLUTE INTERFEROMETER MEASURING PROCESS AND APPARATUS HAVING A MEASURING INTERFEROMETER, CONTROL INTERFEROMETER AND TUNABLE LASER This application is a continuation of application Ser. No. 08/236,927, filed May 2, 1994, now abandoned.

BACKGROUND OF THE INVENTION

1. Field of the Invention

The invention concerns an absolute interferometric measuring process, in particular for absolute distance measurements, employing a laser which can be tuned without mode-jumping in at least one wavelength range and a measuring interferometer which is subjected to the laser beam, whereby at least one of the interferometer arms is configured as a variable measuring line, and a laser interferometer configuration suitable for the measuring process, incorporating a laser which is tunable without mode-jumping in a certain wavelength range and a measuring interferometer, on which at least one interferometer arm forms the measuring line, whereby a beam-splitter and two reflectors are provided for the purpose of generating at least two mutually interfering component beams, and with a photodetector provided on the interferometer arm for the purpose of detecting the interference signal, further with a counter or electronic counting device for the purpose of measuring the phase change and a control device for the laser wavelength.

2. Description of the Prior Art

A device for measuring the distance of an object via the use of a laser beam, consisting of a measuring interferometer and a reference interferometer, is known from DE-PS 36 08 075. Both interferometers are supplied with the beam from the same laser. By means of frequency modulation of the laser beam, a so-called reference beat wave is generated from each 2 mutually interfering component beams, whereby the respective numbers of waves in the measuring beat wave and the reference beat wave are determined using a measuring device, and the measuring line is determined on the basis of the ratio between the numbers of these waves and the known reference distance. With this process, a measuring device begins counting the waves in the reference beat wave at the same point in time at which it begins to count the waves in the measuring beat wave. Consequently, the number of waves in the reference beat wave is not generally integral. The process takes account of this situation by virtue of the fact that the measuring device is designed in such a manner as to enable the number of waves in the reference beat signal to be determined with a level of precision which is more accurate than the decimal point.

On the basis of these specifications, the phase of the reference beat wave has a maximum resolution of approximately 1/10 of the total wavelength. This resolution falls far short of the resolutions attainable with other methods, however.

A laser interferometer is also known from DE-PS 34 04 963 whereby, in addition to the actual measuring interferometer, an additional, so-called control interferometer is employed to control the air wavelength. This control interferometer serves to compensate any disturbances of the air wavelength which may occur within the measuring line of the measuring interferometer in the course of a measuring operation.

SUMMARY OF THE INVENTION

The object of the present invention, therefore, is to increase the measuring accuracy of a distance-measuring process and a device of the above-specified type and to compensate as extensively as possible any disturbances of the air wavelength of the laser which may result, for example, from fluctuations in temperature or air pressure within the respective measuring lines and, after one absolute distance measurement, to continue measuring operations in incremental mode at a known laser wavelength until the beam or the measuring process is interrupted, after which absolute measuring mode can be run once again.

This object is attained by the measuring process in accordance with the present invention by virtue of the fact that the air wavelength of the laser beam is first of all adjusted by means of an additional control interferometer or an interferometer cascade consisting of at least two control interferometers with a control segment to a wavelength value of $\lambda_1$, which is followed by a mode-jump-free range of the characteristic field of the laser extending to a wavelength value of at least $\lambda_2$, whereby at least one interference signal is formed at both the measuring interferometer and the control interferometer, and that the air wavelength is subsequently continuously tuned to a wavelength value in the proximity of $\lambda_2$ and adjusted to this value by means of the control interferometer, whereby during the wavelength modulation process the (respective) integral phase changes, $\Delta\Phi$, of the interference signal(s) of the measuring interferometer are continuously detected and the length, $L_{abs}$, of the measuring line is determined according to the formula $$L_{abs} = \frac{\Delta\Phi}{2} \cdot \frac{\lambda_1 \cdot \lambda_2}{\lambda_2 - \lambda_1},$$

whereby the expression $$\Lambda_s = \frac{\lambda_1 \cdot \lambda_2}{\lambda_2 - \lambda_1}$$

can also be determined via calibration.

The measuring process in accordance with the present invention differs from the prior art in that no absolute linear distances are employed in determining the measuring line, but only values of the wavelength, the beat wavelength and phase change. Furthermore, due to the wavelength control function at the respective end points of the wavelength interval, the measuring process in accordance with the present invention offers the advantage that the generally occurring fractional parts of the phase changes of the interference signal to be measured can be determined at a resolution of better than 1/100. Controlling the two wavelength values by means of a control interferometer furthermore ensures that any disturbances which may occur in the measuring line of the above-described type during phase measurement are compensated.

The measuring process in accordance with the present invention can furthermore be configured so as to employ a control segment of a length in the centimeter range.

The measuring process in accordance with the present invention can furthermore be configured so that after one absolute measuring cycle, operations are continued in incremental measuring mode, in accordance with conventional interferometry.

When a solid-state laser is employed, the wavelength $\lambda_2$ is particularly expedient, due to the higher power level of the laser beam and the pronounced monomode characteristic.

For the first time, the measuring process in accordance with the present invention enables absolute and incremental distance measurements to be combined, as this process ensures absolute control of the air wavelengths. This is possible, because absolute measurement of the wavelength values is carried out in this process. A combination of absolute and incremental distance measurement is expedient, for example, when incremental distance measurements are generally sufficient to control an automatic production plant, while absolute measurements are occasionally necessary, e.g. for adjustment purposes, or when the beam is broken or measuring operations have been interrupted in some other way, e.g. as a result of an excessively high displacement speed of the measuring reflector being determined by the electronic cut-off frequency.

The measuring process in accordance with the present invention can furthermore be configured in such a manner that the wavelength modulation is effected via the operating current of the laser.

In order to minimize the time required for a measuring cycle and, subsequently, to reduce the influence of errors to a minimum, it is expedient when employing a solid-state laser to effect wavelength variation via current modulation only, and not, for example, by varying the temperature of the heat sink of the laser. Although the continuous tuning range is approximately 5 times greater when temperature variation is employed than when current variation is used, the former process requires several seconds, in comparison to several milliseconds for current modulation. Alternatively, a solid-state laser with an external resonator grid can be employed, for example, whereby the wavelength is varied by turning and/or displacing the resonator grid. As a further alternative, modulation can also be effected via a combination of temperature, current and turning and/or displacement of the resonator grid.

The measuring process in accordance with the present invention can furthermore be configured in such a manner that the respective residual phases are determined in the range of the wavelength values $\lambda_1$ and $\lambda_2$.

The term 'residual phases' refers to the fractional phase values at the ends of the complete wavelength interval.

The measuring process in accordance with the present invention can furthermore be configured in such a manner that in the measuring interferometer at least, mutually phase-displaced interference signals are generated in each case from a minimum of two interfering component beams, whereby each of these signals is measured using a photodetector.

As is known, interference signals in phase quadrature, for example, can be generated by inserting a quarter-wave plate in the beam path. Firstly, this procedure offers the advantage that incremental distance measurements can be carried out in addition to absolute interferometric measurements, whereby it is known that the insertion of a quarter-wave plate into the measurement section, for example, also enables the direction of the relative movements of the object being measured to be determined.

Secondly, this procedure also enables further improvement of the resolution for phase measurements, which can be implemented with the present invention by determining the integral phase change on the basis of the elliptic Lissajous figure formed by two interference signals in phase quadrature.

Evaluation of the Lissajous ellipse permits extremely accurate determination of the phases of the interference signals, and the residual phases in particular. However, to enable this evaluation to be carried out in an effective manner, it must be ensured that the light intensities of the interference signals in phase quadrature which are recorded by the photodetectors lie on a circular Lissajous curve in a biaxial representation. The measured phase values do not generally lie on a circle, however, but on an ellipse, which, on account of the power characteristics of a solid-state laser, is not closed when current modulation is employed, but expands in a spiral shape. The elliptical shape is due primarily to phase displacement which is not precisely 90°, unequal amplitude factors of the two interference signals in phase quadrature and the occurrence of an offset. A method of correcting the measured phase values is provided by the established Heydemann correction procedure, which transforms the ellipticity of the Lissajous curve into a circle, via transformation of the principal axes. For this purpose, however, a complete signal period must be recorded, using as many measuring points as possible.

In order to achieve this, the measuring process in accordance with the present invention can furthermore be configured in such a manner that, in order to determine the residual phases, the wavelength control function is deactivated at wavelength value $\lambda_1$ and $\lambda_2$ and the operating current of the laser is varied in such a manner that the phase change in these ranges can be determined over at least one wave period, and that the residual phase in each case is determined by adapting an ellipse to the two interference signals in phase quadrature forming the elliptic Lissajous figure and subsequent transformation into a circle.

The measuring process in accordance with the present invention can furthermore be configured in such a manner that the interference signals of the measuring interferometer are transmitted to pre-amplifiers, the gain of which is inversely proportional to the laser output power.

The measuring process in accordance with the present invention can furthermore be configured in such a manner that a reference interferometer is additionally employed, the fixed reference distance of which corresponds to approximately half the measuring line, and the configuration of which otherwise corresponds to that of the measuring interferometer.

A combination of the known reference distance method with the measuring process in accordance with the present invention unites the advantage of minimal measuring uncertainty resulting from a long reference distance with the advantage of a very precise knowledge of the wavelengths. A measuring set-up is conceivable, for example, whereby in addition to the actual absolute interferometer both an interferometer for controlling the wavelengths and a reference interferometer are employed. A reference distance of approximately half the measuring line has the advantage that optimal correspondence of the air conditions in the two interferometers is guaranteed for all measuring lines. For this purpose it is expedient, however, to install the two interferometers at the smallest possible distance from one another.

The use of a reference interferometer enables comparative values to be determined for the measuring line, whereby in accordance with the present invention provision can be made for the phase changes generated as a result of the wavelength modulation in the reference interferometer and the measuring interferometer, $\Delta\Phi_{Ref}$ and $\Delta\Phi_{abs}$, to be measured, whereby the length, $L_{abs}$, of the measuring line is determined, when the length, $L_{Ref}$, of the reference distance is known, according to the formula $$L_{abs} = L_{Ref} \frac{\Delta\Phi_{abs}}{\Delta\Phi_{Ref}} .$$

The measuring process in accordance with the present invention can furthermore be configured in such a manner that phase changes $\Delta\Phi_{abs}$ and $\Delta\Phi_{Ref}$ are determined via the same trigger signal, by means of oversampling.

When determining the integral phase change by metrological means, it is generally determined in the form of a step-type digitalisation curve. The number of digitalisation steps employed in absolute interferometry using the solid-state lasers which are commercially available today is generally extremely small, and smaller than applies in conventional interferometry by a factor of $$\frac{\lambda_{1,2}}{\lambda_2 - \lambda_1} \cong 4,000$$

When employing digital data acquisition, an increase in the phase resolution can be attained via oversampling by the electronic measuring system at a constant sampling rate, whereby the increase in resolution is proportional to the ratio of the step length to the length of one sampling interval. The wavelength end ranges within which oversampling is effected correspond to a maximum of ½ of the total wavelength interval.

The measuring process in accordance with the present invention can finally be configured in such a manner that a second laser or a multi-wavelength laser is employed, which additionally emits a laser beam with at least one additional discrete wavelength, $\lambda_3$, which is also input into the respective interferometers, whereby the laser wavelengths are operated alternately in succession, and whereby wavelength value $\lambda_3$ is tuned in accordance with wavelength values $\lambda_1$ and $\lambda_2$ in such a manner that a synthetic beat of a specific beat wavelength is formed by subsequently superposing the two laser beams with the aid of an electronic device or a computer.

These measures enable a further increase in the linear resolution of the measuring process in accordance with the present invention. The additional discrete wavelength enables a beat wavelength to be generated which is greater than the measuring uncertainty resulting from the method of continual tuning of the wavelength. Superposition of $\lambda_1$ and $\lambda_3$ is also possible, as the residual phase belonging to $\lambda_1$ has already been measured. This provides a method of checking for errors, as both $\lambda_1$ and $\lambda_3$ and $\lambda_2$ and $\lambda_3$ must provide a consistent result.

The object of the present invention is attained with a laser interferometer configuration which is suitable for the measuring process in accordance with the present invention by virtue of the fact that a control interferometer or an interferometer cascade consisting of at least two control interferometers is provided, the distance between the lengths of the interferometer arms of which is constant, whereby the measuring interferometer and the control interferometer(s) are supplied with the beam from one and the same laser by means of a primary beam-splitter and at least one reflector or optical waveguide.

Possible laser sources are a junction or solid-state laser. The configuration of the control interferometer is similar to that of the measuring interferometer, apart from the fact that the difference in the length of the interferometer arms is constant, i.e. the length of the control segment in particular is fixed, and that the control segment is shorter than half the length of the measuring line. An advantage of a short control segment is that the control interferometer will not switch to a different order in the event of disturbances, such as temperature or air-pressure fluctuations in the measuring line or the control segment. Although this is achieved at the cost of the resolution which is attainable with the control interferometer, the accuracy which is subsequently attainable with the interferometer configuration in accordance with the present invention nevertheless remains sufficient.

When an interferometer cascade is used, control interferometers with different control segments are employed. An initial interferometer with a short control segment enables the control system to lock into a preset wavelength when it is switched on. This interferometer stabilizes the wavelength with a sufficient degree of accuracy to ensure that the system locks onto the correct wavelength when it is subsequently switched to a long control segment. A better level of stabilisation is then attainable with the long control segment.

With the laser interferometer configuration in accordance with the present invention, provision can also be made for the length of the control segment to be in the centimeter range.

With the laser interferometer configuration in accordance with the present invention, provision can also be made for pre-amplifiers to be provided for the interference signals of the measuring interferometer, the gain of which pre-amplifiers is inversely proportional to the laser output power. Down-line of the pre-amplifiers, the signal levels are then independent of the laser power and, subsequently, of the wavelength.

With the laser interferometer configuration in accordance with the present invention, provision can also be made for a quarter-wave plate to be installed in the beam path of the control segment of the control interferometer.

This measure means that the orders can also be counted by means of the control interferometer during continuous wavelength modification.

The laser interferometer configuration in accordance with the present invention can also be designed in such a manner as to incorporate an additional reference interferometer, the difference in the length of the interferometer arms of which is constant, and the reference distance of which corresponds to approximately half the measuring line.

The combination of a measuring interferometer with a reference interferometer unites the advantage of minimal measuring uncertainty resulting from a long reference distance with the advantage of a very precise knowledge of the wavelengths.

The laser interferometer configuration in accordance with the present invention can also be designed in such a manner as to incorporate a second laser or a multi-wavelength laser which emits a laser beam with at least one discrete wavelength other than wavelength values $\lambda_1$ and $\lambda_2$.

Via subsequent superposition of the laser beam waves which now occur, an overall beat wavelength can be generated which is greater than the measuring uncertainty resulting from the method of continuous tuning of the wavelength. In this way, the resolution of the laser interferometer configuration can be further increased.

The laser interferometer configuration in accordance with the present invention, can also be designed in such a manner as to incorporate a counter or an electronic counting device and an electronic analysis system or a computer, for the purpose of automating the phase analysis process.

This enables all the steps involved in the measuring process to be automated and, subsequently, successive distance measurements to be carried out.

Finally, with the laser interferometer configuration in accordance with the present invention, provision can be made for at least part of the configuration to take the form of an integrated optical system and part of the light path to take the form of an optical waveguide.

Miniaturisation is made possible by the exclusive use of components in standard use in the field of integrated optical systems, and opens up an even more extensive scope of applications for the laser interferometer configuration in accordance with the present invention. Connections between individual components can be effected via optical waveguides.

In the following part of this patent application, the measuring process in accordance with the present invention is described in detail by reference to an embodiment of the invented laser interferometer configuration.

DETAILED DESCRIPTION OF THE PRESENTLY PREFERRED EMBODIMENTS

Figure 1:
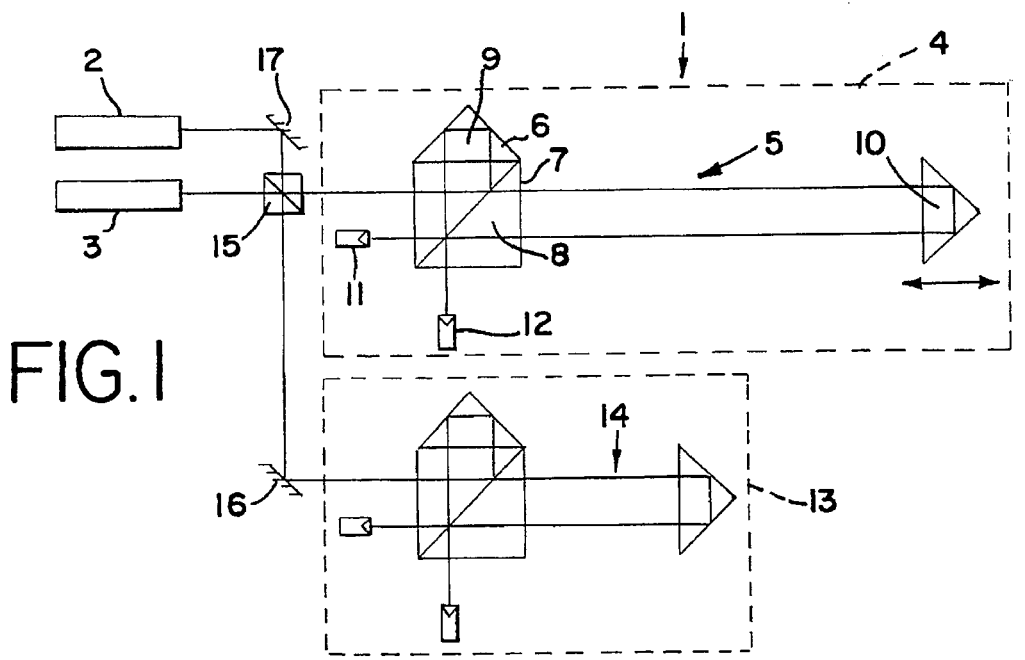
FIG. 1 shows an embodiment of the invented laser interferometer configuration incorporating two lasers.

The laser interferometer configuration, 1, for absolute measurements which is shown in FIG. 1 incorporates two tunable lasers, 2, 3, whereby laser 2 modulates its characteristic by means of an operating current supply unit (not shown) in a wavelength range of its characteristic which is free of mode jumps, while laser 3 is operated at a fixed wavelength. A measuring interferometer, 4, is also incorporated, an interferometer arm, 5, of which forms the actual measuring line. A beam-splitter, 8, and two retroreflectors, 9, 10, are provided for the purpose of generating at least two mutually interfering component beams, 6, 7. The interfering component beams, 6, 7, are detected by means of photodetectors, 11, 12. The photodetectors, 11, 12, are connected to an electronic counting device (not shown), and the lasers, 2, 3, are each connected to a control device (not shown) for the wavelength range. In the direct vicinity of the measuring interferometer, 4, there is a control interferometer, 13, the control segment, 14, of which is of a constant length amounting to less than half the length of the measuring line. The configuration of the control interferometer, 13, is otherwise identical to that of the measuring interferometer, 4. The measuring interferometer, 4, and the control interferometer, 13, are subjected to the beam of the same laser, 2, 3, by means of a primary beam-splitter, 15, and a reflector, 16. The beam from laser 2 is input via a reflector, 17. The exclusive use of standard components enables the entire laser interferometer configuration, 1, to be set up as an integrated optical system.

The absolute distance, $L_{abs}$, can be determined, for example, by employing the measured residual phases, $\phi_2$ and $\phi_3$, to determine that distance in an interval around the distance established via the method of continuous tunability for which the equation:

$$l_{abs} = (m_2 + \phi_2) \cdot \frac{\lambda_2}{2} = (m_3 + \phi_3) \cdot \frac{\lambda_3}{2}$$

is best fulfilled, whereby the interval must be greater than twice the measuring uncertainty involved in this method and smaller than half the synthetic wavelength. This can be carried out, for example, by determining those distances in the interval which are possible on the basis of $\phi_2$ and $\lambda_2$ and $\phi_3$ and $\lambda_3$, sorting these distances according to magnitude and seeking the distance at which the difference between two successive distances is minimal. This results in the integral interference ordinal, $m_2$ or $m_3$. In this case, determination of the absolute distance with the measured residual phases $\phi_1$ and $\phi_3$ can serve as a verification measure. The extremely accurate phase measurement enables the absolute measurement of distances to a fraction of the individual wavelength, that is, at a phase resolution of 1/100 for $\lambda_2 \div 100$. For a measuring line in the meters range, this process requires a wavelength control system which is better than $10^{-7}$—which is not possible with "free-running" solid-state lasers (that is, with only current and temperature control)—, as a phase resolution of 1/100 is otherwise of no practical use.

Figure 2:
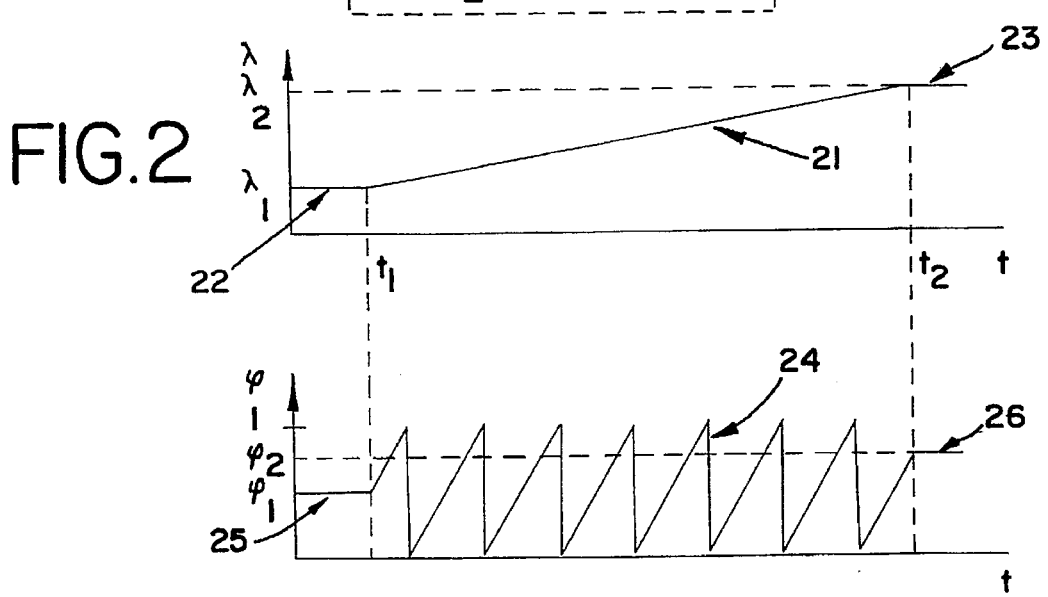
FIG. 2 shows an example of wave modulation in accordance with the measuring process and a resultant phase characteristic of the interference signal which is produced in the measuring interferometer.

The wavelength curve, 21, shown at the top of FIG. 2 has a constant wavelength value of $\lambda_1$, 22, at the time, t1, of the beginning of a measurement. Up to this time, adjustment of this wavelength value is effected by means of the control interferometer, 13. This wavelength value is selected so that it is followed by a substantial range of the laser which is free of mode jumps in the direction of higher values. At time t1, the control interferometer is temporarily deactivated and the laser wavelength is modulated in accordance with the characteristic of curve 21, via continual variation of the laser operating current. At a wavelength, $\lambda_2$, (23) located within the mode-jump-free range, the control interferometer, 13, is then switched on again and adjusted to this wavelength value. The phase change, 24, which occurs in the course of wavelength modulation is shown at the bottom of FIG. 2. The saw-tooth profile of this curve, 24, results from the fact that in the course of tuning of the wavelength the phase changes linearly in each case until a new order of interference is passed over. As the wavelength is controlled by the control interferometer, the constant phase values, 25, 26, at the respective ends of the measuring range can be determined with a very high degree of accuracy. The manner in which the respective residual phases, which are expressed as a whole in the difference between the initial phase, $\phi_1$, and the end phase, $\phi_2$, are determined in precise terms is discussed below. The integral phase change, $\blacktriangle \phi$, is obtained by simply counting the saw-tooth peaks and adding the residual phases determined at the end points of the measuring curve, 24. The measuring line is then determined on the basis of the total (integral) phase change of the interference signal and wavelength values $\lambda_1$ and $\lambda_2$, according to the formula specified in claim 1 or, alternatively, by means of a preceding calibration process, which may take the form, for example, of measurement at two different positions which are as far apart as possible and simultaneous measurement of the distance between these two positions by means of another suitable method, to produce a ratio, k=$\blacktriangle L/\blacktriangle \Phi$, with which absolute distances can be determined via $L_{abs}$=k·$\blacktriangle \Phi$. It is emphasized that the exact knowledge of the wavelength $\lambda_2$ permits an absolute measurement to be followed by an incremental measurement.

Figure 3:
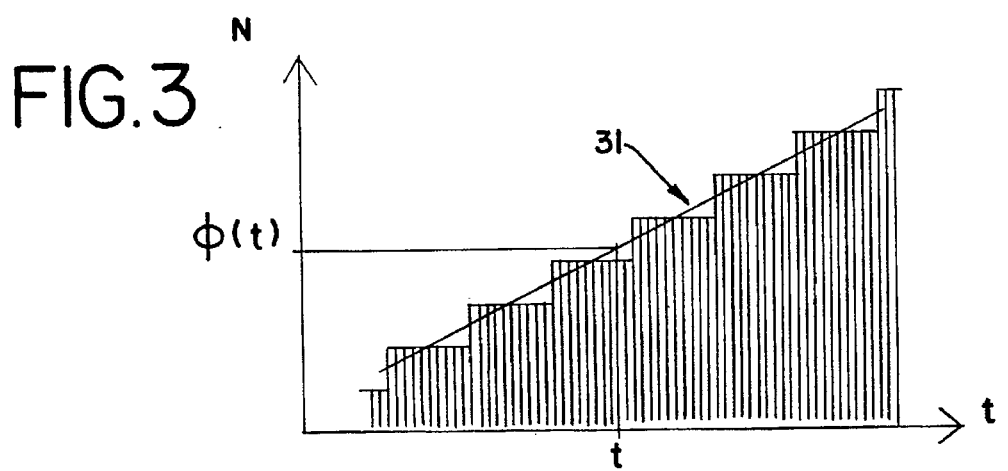
FIG. 3 shows a diagrammatic representation of the phase resolution attained via oversampling.

The diagram in FIG. 3 shows phase resolution by means of oversampling, such as can be carried out using an additional reference interferometer. In this case, this oversampling is carried out only at the beginning and end of a measuring cycle. The diagram shows a digitalisation curve, 31, recorded, for example, at the beginning of wavelength modulation. As the measured values are recorded simultaneously in the measuring and reference interferometers at the beginning and end of wavelength modulation (approx. 10,000 measured values in each case), a subsequently large number of corresponding integral phase differences, $N_{abs}$ and $N_{Ref}$, can be established, on the basis of which the absolute distance can be calculated according to:

$$L_{abs} = L_{Ref} \frac{N_{abs}}{N_{Ref}} \ .$$

In this case, an increased resolution is attained by virtue of the fact that 10,000 differences, $N_{abs}$ and $N_{Ref}$, are available per measuring cycle, and averaging can subsequently be carried out over these differences.

Figure 4:
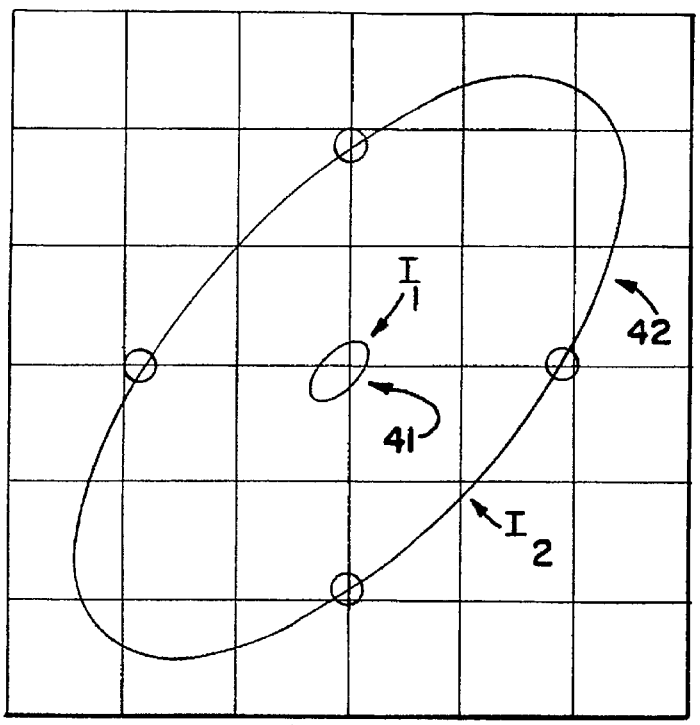
FIG. 4 shows the Lissajous ellipse of two interference signals in phase quadrature.

FIG. 4 shows a Lissajous ellipse, determined via analytical adaption to two interference signals, 6, 7, in phase quadrature, which are detected by means of photodetectors 11, 12. The inner Lissajous curve, 41, represents the phase characteristic of the two interference signals of a wave period at the beginning of a measuring cycle, while the outer curve, 42, represents the phase characteristic at the end of a measuring cycle. The different radii result from the fact that the power characteristic of the laser increases with the wavelength. Each of the residual phases, $\phi_1$ and $\phi_2$, lies on one of these curves and can thus be determined very accurately on the basis of the curves. For this purpose, it will generally be expedient to transform the ellipse into a circle beforehand, however, in accordance with the established procedure.

Figure 5:
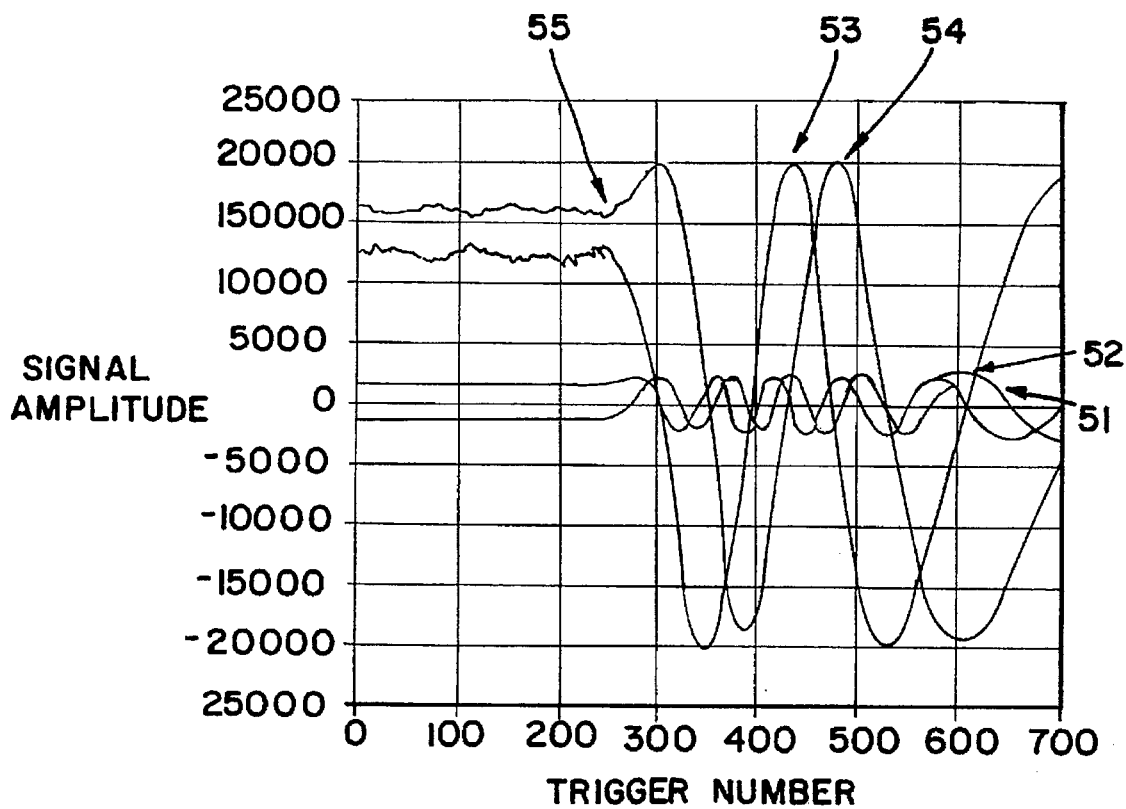
FIG. 5 shows a signal characteristic for the purpose of phase determination in accordance with the method of variation of the laser wavelength in the range of the residual phases.

Finally, FIG. 5 shows a signal characteristic for the purpose of phase determination according to the method of varying the laser wavelength in the range of the wavelength end values. In addition to the phase values determined here in static mode, the phases of a complete period are also recorded. The diagram in FIG. 5 shows this procedure for items of phase data, 51, 52, of the interference signals in phase quadrature which are recorded at the beginning of a measuring cycle and for data items, 53, 54, recorded accordingly at the end. In order to record these curves, 51, 52, 53, the wavelength control function of the control interferometer, 13, is briefly deactivated at time 55, and a phase change over at least one period is induced by varying the operating current of the laser. A Lissajous ellipse is adapted to the data determined in this manner, and this ellipse can then be evaluated according to the method presented in FIG. 4.

By way of variation from FIG. 1, in order to attain particularly reliable evaluation, the established method employing pairs of differentially connected signals, that is, the so-called push-pull evaluation process employing four mutually phase-displaced signals, can also be applied. A further effective evaluation method may be applied by generating three interference signals which are mutually phase-displaced by approximately 120°.

What is claimed is:

1. A method for making absolute measurements, said method comprising the steps of:
  providing a tunable laser having a variable operating current and an output power, the laser emitting a laser beam having a wavelength;
  providing a measuring interferometer having a measuring line of variable length, said measuring interferometer comprising; a beam splitter, a first reflector, a second reflector and at least one detector wherein said beam splitter, said first reflector and said detector are mounted on a first object and said second reflector is mounted on a second object, said second object being displaceable with respect to said first object wherein said measuring line extends from said beam splitter to said reflector;
  providing a control interferometer having a control segment of fixed length, said control interferometer comprising; a beam splitter, a first reflector, a second reflector and at least one detector wherein said beam splitter, said first and said second reflectors and said detector are mounted on a first object and said control segment extends from said beam splitter to said second reflector;
  directing said laser beam onto said beam splitter of said measuring interferometer and said control interferometer causing interference in said measuring interferometer and control interferometer;
  detecting said interference of said control interferometer and adjusting, based on said detected interference, the first wavelength $\lambda_1$ until it is free of mode jumps;
  deactivating said control interferometer after said laser is adjusted to said first wavelength $\lambda_1$;
  modulating the wavelength of said laser from said first wavelength $\lambda_1$ to a second wavelength $\lambda_2$;
  detecting said interference of said measuring interferometer;
  detecting an integral phase change $\Delta\phi$ of said detected interference;
  calculating an absolute length $L_{abs}$ of said measuring line according to equation $$L_{abs} = \frac{\Delta\phi}{2} \cdot \frac{\lambda_1 \cdot \lambda_2}{\lambda_2 - \lambda_1} \ ;$$

and
  activating said control interferometer when the wavelength of said laser is at said second wavelength $\lambda_2$.

2. A method according to claim 1 wherein said control segment has a length in centimeters.

3. A method according to claim 1 wherein said step of modulating the wavelength of said laser is performed by continually altering the operating current of said laser.

4. A method according to claim 3 further comprising the step of measuring incremental distances in accordance with conventional interferometry.

5. A method according to claim 3 wherein mutually phase-displaced interference signals are generated in each case from a minimum of two interfering component beams, whereby each of the phase-displaced interference signals is measured using a photodetector in said measuring interferometer.

6. A method according to claim 3 further comprising the step of detecting residual phases at said first wavelength $\lambda_1$ and said second wavelength $\lambda_2$.

7. A method according to claim 6 further comprising the step of determining residual phases at said first wavelength $\lambda_1$ and at said second wavelength $\lambda_2$ respectively, by deactivating said control interferometer at said first wavelength $\lambda_1$ and said second wavelength $\lambda_2$, respectively, and varying the operating current of said laser in such a manner that in a range of said first wavelength $\lambda_1$ and said second wavelength $\lambda_2$, respectively, the phase change can be determined over at least one wave period, and that the residual phase in each case is determined by adapting an ellipse to said at least two interference signals in phase quadrature to form an elliptic Lissajous figure and subsequent transformation into a circle.

8. A method according to claim 1 further comprising the step of measuring incremental distances in accordance with conventional interferometry.

9. A method according to claim 8 wherein the interference signal of said measuring interferometer is transmitted to pre-amplifiers, having a gain which is inversely proportional to the laser output power.

10. A method according to claim 8 wherein a second laser or a multi-wavelength laser is employed, which additionally emits a laser beam with at least one additional discrete wavelength, $\lambda_3$, which is also input into the respective interferometers, whereby the laser wavelengths are operated alternately in succession, and whereby wavelength value $\lambda_3$ is tuned in accordance with wavelength values $\lambda_1$ and $\lambda_2$ in such a manner that a synthetic beat of a specific beat wavelength is formed by subsequently superposing the two laser beams with the aid of an electronic device or a computer.

11. A method according to claim 1 further comprising the step of detecting residual phases at said first wavelength $\lambda_1$ and said second wavelength $\lambda_2$.

12. A method according to claim 11 wherein mutually phase-displaced interference signals are generated in each case from a minimum of two interfering component beams, whereby each of the phase-displaced interference signals is measured using a photodetector in said measuring interferometer.

13. A method according to claim 1 wherein mutually phase-displaced interference signals are generated in each case from a minimum of two interfering component beams, whereby each of the phase-displaced interference signals is measured using a photodetector in said measuring interferometer.

14. A method according to claim 13 wherein said integral phase change is determined by an elliptical Lissajous figure formed by interference signals in phase quadrature.

15. A method according to claim 1 wherein the interference signal of said measuring interferometer is transmitted to pre-amplifiers, having a gain which is inversely proportional to the laser output power.

16. A method according to claim 15 wherein a second laser or a multi-wavelength laser is employed, which additionally emits a laser beam with at least one additional discrete wavelength, $\lambda_3$, which is also input into the respective interferometers, whereby the laser wavelengths are operated alternately in succession, and whereby wavelength value $\lambda_3$ is tuned in accordance with wavelength values $\lambda_1$ and $\lambda_2$ in such a manner that a synthetic beat of a specific beat wavelength is formed by subsequently superposing the two laser beams with the aid of an electronic device or a computer.

17. A method according to claim 1 further comprising a reference interferometer having a substantially configuration as said measuring interferometer except for a fixed reference distance corresponding to approximately half said measuring line.

18. A method according to claim 17 wherein the phase changes generated as a result of the wavelength modulation in the reference interferometer and the measuring interferometer, $\Delta\Phi_{Ref}$ and $\Delta\Phi_{abs}$, are measured, respectively whereby a length, $L_{abs}$, of the measuring line is determined, when a length, $L_{Ref}$, of the fixed reference distance is known, according to the formula $$L_{abs} = L_{Ref} \frac{\Delta\Phi_{abs}}{\Delta\Phi_{Ref}} .$$

19. A method according to claim 18 wherein phase changes $\Delta\Phi_{abs}$ and $\Delta\Phi_{Ref}$ are determined via the a trigger signal, by means of oversampling.

20. A method according to claim 1 wherein a second laser or a multi-wavelength laser is employed, which additionally emits a laser beam with at least one additional discrete wavelength, $\lambda_3$, which is also input into the respective interferometers, whereby the laser wavelengths are operated alternately in succession, and whereby wavelength value $\lambda_3$ is tuned in accordance with wavelength values $\lambda_1$ and $\lambda_2$ in such a manner that a synthetic beat of a specific beat wavelength is formed by subsequently superposing the two laser beams with the aid of an electronic device or a computer.

* * * * *

UNITED STATES PATENT AND TRADEMARK OFFICE
CERTIFICATE OF CORRECTION

PATENT NO. : 5,631,736
DATED : May 20, 1997
INVENTOR(S) : Jürgen Thiel et al.

It is certified that error appears in the above-identified patent and that said Letters Patent is hereby corrected as shown below:

In claim 19, line 2, delete "the".

Signed and Sealed this

Twenty-second Day of February, 2000

Attest:

Q. TODD DICKINSON

*Attesting Officer*   *Commissioner of Patents and Trademarks*